April 9, 1929.  J. S. HUNTER  1,708,577
POWER TRANSMITTER
Filed Sept. 23, 1926  2 Sheets-Sheet 1

John S. Hunter
Inventor
By C. A. Snow & Co.
Attorneys.

April 9, 1929.   J. S. HUNTER   1,708,577
POWER TRANSMITTER
Filed Sept. 23, 1926   2 Sheets-Sheet 2

John S. Hunter
Inventor

Patented Apr. 9, 1929.

1,708,577

UNITED STATES PATENT OFFICE.

JOHN SAMUEL HUNTER, OF COALINGA, CALIFORNIA.

POWER TRANSMITTER.

Application filed September 23, 1926. Serial No. 137,323.

This invention aims to provide a simple means whereby a long stroke may be imparted to a pump plunger or other reciprocating part.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1:
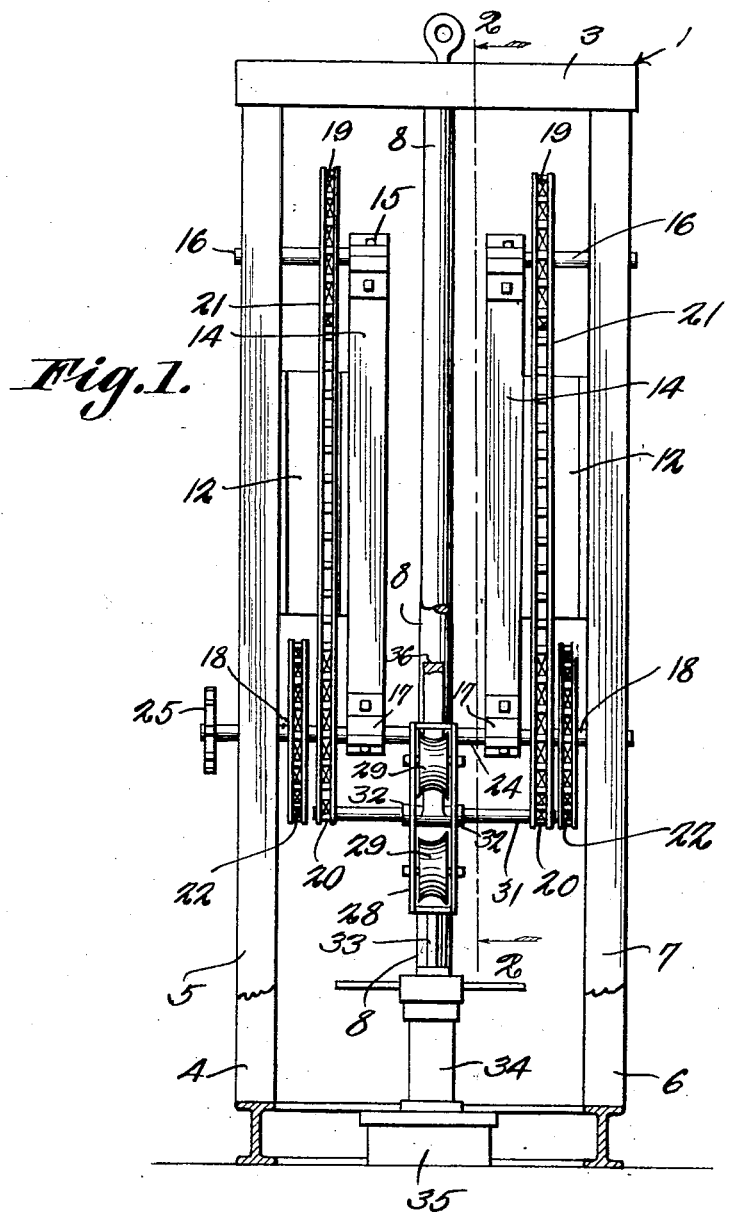
Figure 1 shows in elevation, a device constructed in accordance with the invention.
Figures 2, 3:
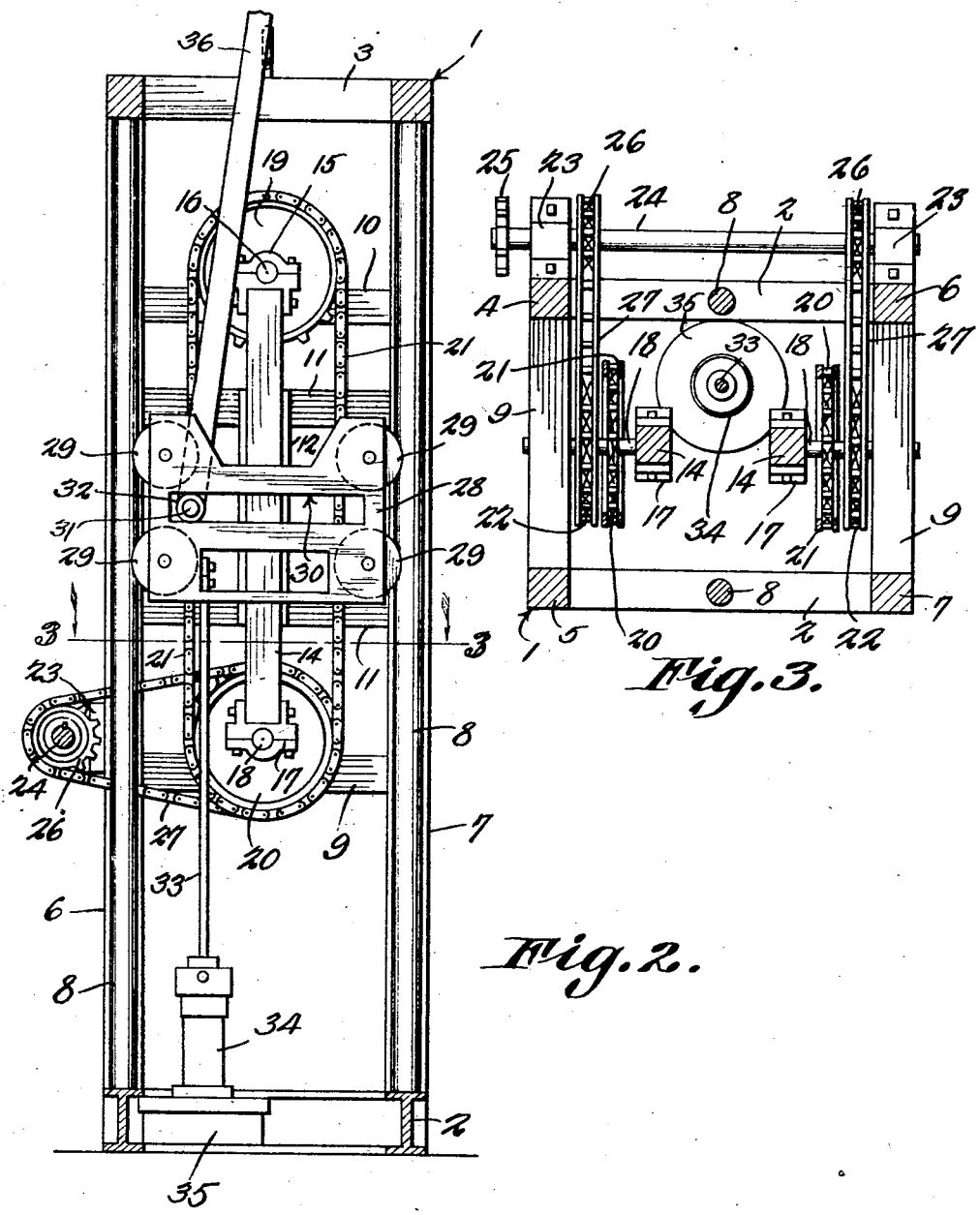
Figure 2 is a vertical section on the line 2—2 of Figure 1.
Figure 3 is a horizontal section on the line 3—3 of Figure 2.

The device comprises a supporting frame 1. The frame 1 may be made in any desired way. As depicted in the drawings, but not of necessity, the frame 1 embodies a base 2 and a top 3, connected by corner posts 4, 5, 6 and 7. Guide rods 8 are located between the posts 4—6 and 5—7. The upper ends of the guide rods 8 are mounted in the top 3. The lower ends of the guide rods 8 are mounted in the base 2. Lower cross pieces 9 connect the posts 4—5 and 6—7. Upper cross pieces 10 connect the posts 4—5 and 6—7. Pairs of vertically spaced intermediate cross pieces 11 connect the posts 4—5 and 6—7. Vertical brackets 12 are mounted at their ends on the cross pieces 11 of the pairs. Standards 14 are secured to the inner edges of the brackets 12. The standards 14 extend above and below the cross pieces 11.

There are bearings 15 on the upper ends of the standards 14 and on the upper cross pieces 10. Upper shafts 16 are journaled in the bearings 15. There are bearings 17 on the lower ends of the standards 14 and on the lower cross pieces 9. Lower shafts 18 are journaled in the bearings 17. Sprocket wheels 19 are secured to the shafts 16. Sprocket wheels 20 are secured to the shafts 18. Sprocket chains 21 are engaged about the sprocket wheels 19 and 20. Sprocket wheels 22 are secured to the lower shafts 18 outwardly of the sprocket wheels 20. The posts 4 and 6 carry horizontally projecting bearings 23. A horizontal shaft 24 is journaled in the bearings 23. The shaft 24 is supplied at one end with a drive wheel 25. Sprocket wheels 26 are secured to the shaft 24. The sprocket wheels 26 are located inwardly of the bearings 23. Sprocket chains 27 are engaged with the sprocket wheels 26 and 22.

A carriage 28 is mounted for vertical reciprocation on the frame 1. The carriage 28 has grooved wheels 29. The grooved wheels 29 cooperate with the guide rods 8 to hold the carriage 28 on the frame 1 for vertical right-line reciprocation. The carriage 28 is supplied in its sides with horizontal guide slots 30. A connection 31, such as a rod, joins the sprocket chains 21. Rollers 32 are journaled on the connection 31. The rollers 32 are anti-friction elements, movable in the guide slots 30 of the carriage 28. The upper end of a plunger 33 is secured to the carriage 28. The plunger 33 works in a gland 34 on a casing head 35. The plunger 33 may be taken to indicate any element which is to be driven. If an overhead structure, such as a walking beam (not shown) is to be driven, it may be expedient to provide a pitman 36, the lower end of which is mounted to swing on the connection or rod 31 between the rollers 32. The pitman 36 may be omitted if desired.

The shaft 24 is rotated by the drive wheel 25 or its equivalent, and sprocket wheels 26, the sprocket chains 27, the sprocket wheels 22, the shafts 18, and the sprocket wheels 20, operate the sprocket chains 21. The connection 31 between the sprocket chains 21 is caused to move in an orbit, and the rollers 32 on the connection 31, moving in the guide slots 30 of the carriage 28, impart right-line reciprocation to the carriage and to the plunger 33 or its equivalent, the wheels 29 of the carriage traversing the guide rods 8. A very long stroke may be given to the carriage 28, and the time consumed in a reversal, at the ends of the stroke, is not much.

The device is simple but will be found thoroughly effective for the ends in view.

What is claimed is:—

In a device of the class described, a frame, parallel sprocket chains, means for mounting the sprocket chains to move on the frame, a carriage, means for mounting the carriage on the frame for right line reciprocation, the carriage having guides disposed transversely of the line of reciprocation of the carriage, a connection joining the chains, means for mounting the connection slidably in the guides of the carriage, and a pitman mounted to swing on the connection, between the guides.

In testimony that I claim the foregoing as my own, I have hereto affixed my signature.

JOHN SAMUEL HUNTER.